(12) United States Patent
Boyd et al.

(10) Patent No.: US 7,496,045 B2
(45) Date of Patent: Feb. 24, 2009

(54) BROADCAST OF SHARED I/O FABRIC ERROR MESSAGES IN A MULTI-HOST ENVIRONMENT TO ALL AFFECTED ROOT NODES

(75) Inventors: William T. Boyd, Poughkeepsie, NY (US); Douglas M. Freimuth, New York, NY (US); William G. Holland, Cary, NC (US); Steven W. Hunter, Raleigh, NC (US); Renato J. Recio, Austin, TX (US); Steven M. Thurber, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 11/191,626

(22) Filed: Jul. 28, 2005

(65) Prior Publication Data
US 2007/0027952 A1 Feb. 1, 2007

(51) Int. Cl.
*H04J 1/16* (2006.01)
(52) U.S. Cl. ...................... 370/242; 370/389
(58) Field of Classification Search ................ 370/216, 370/389, 252, 246, 242–244, 359, 373, 396, 370/395.31; 714/2, 48, 751, 799, 774
See application file for complete search history.

(56) References Cited

U.S. PATENT DOCUMENTS

| 5,257,353 | A |   | 10/1993 | Blanck et al. |
| 5,367,695 | A |   | 11/1994 | Narad et al. |
| 5,392,328 | A | * | 2/1995  | Schmidt et al. ........ 379/27.06 |
| 5,960,213 | A |   | 9/1999  | Wilson |
| 5,968,189 | A | * | 10/1999 | Desnoyers et al. ........ 714/47 |
| 6,061,753 | A |   | 5/2000  | Ericson |
| 6,557,121 | B1 |  | 4/2003  | McLaughlin et al. |
| 6,662,251 | B2 |  | 12/2003 | Brock et al. |
| 6,769,021 | B1 |  | 7/2004  | Bradley |

(Continued)

FOREIGN PATENT DOCUMENTS

WO  2006089914 A1  8/2006

OTHER PUBLICATIONS

U.S. Appl. No. 11/340,447, filed Jan. 26, 2006, Boyd et al.

(Continued)

*Primary Examiner*—Brenda Pham
(74) *Attorney, Agent, or Firm*—Duke W. Yee; Matthew W. Baca; Gerald H. Glanzman (57) ABSTRACT

A method, mechanism and computer usable medium is provided for distributing I/O fabric errors to the appropriate root nodes in a multi-root environment. The case where the I/O fabric is attached to more than one root node and where each root can potentially share with the other roots the I/O adapter (IOA) resources which are attached to the I/O is addressed. Additionally, a method, mechanism and computer usable medium is provided by which errors detected in an I/O fabric may be routed to all root nodes which may be affected by the error, while not being reported to the root nodes that will not be affected by those errors. In particular, distributed computing system which uses the PCI Express protocol to communicate over the I/O fabric is addressed.

3 Claims, 5 Drawing Sheets

U.S. PATENT DOCUMENTS

| | | |
|---|---|---|
| 6,775,750 B2 | 8/2004 | Krueger |
| 6,907,510 B2 | 6/2005 | Bennett et al. |
| 7,036,122 B2 | 4/2006 | Bennett et al. |
| 7,096,305 B2 | 8/2006 | Moll |
| 7,134,052 B2 * | 11/2006 | Bailey et al. .................. 714/44 |
| 7,174,413 B2 | 2/2007 | Pettey et al. |
| 7,188,209 B2 | 3/2007 | Pettey et al. |
| 7,194,538 B1 | 3/2007 | Rabe et al. |
| 2002/0188701 A1 | 12/2002 | Brown et al. |
| 2003/0221030 A1 | 11/2003 | Pontius et al. |
| 2004/0039986 A1 | 2/2004 | Solomon et al. |
| 2004/0123014 A1 | 6/2004 | Schaefer et al. |
| 2004/0172494 A1 | 9/2004 | Pettey et al. |
| 2004/0210754 A1 | 10/2004 | Barron et al. |
| 2004/0230709 A1 | 11/2004 | Moll |
| 2004/0230735 A1 | 11/2004 | Moll |
| 2005/0025119 A1 | 2/2005 | Pettey et al. |
| 2005/0044301 A1 | 2/2005 | Vasilevsky et al. |
| 2005/0102682 A1 | 5/2005 | Shah et al. |
| 2005/0147117 A1 | 7/2005 | Pettey et al. |
| 2005/0188116 A1 | 8/2005 | Brown et al. |
| 2005/0228531 A1 | 10/2005 | Genovker et al. |
| 2005/0270988 A1 | 12/2005 | DeHaemer |
| 2006/0168361 A1 | 7/2006 | Brown et al. |
| 2006/0174094 A1 | 8/2006 | Lloyd et al. |
| 2006/0179195 A1 | 8/2006 | Sharma et al. |
| 2006/0179238 A1 | 8/2006 | Griswell et al. |
| 2006/0179239 A1 | 8/2006 | Frey et al. |
| 2006/0179265 A1 | 8/2006 | Flood et al. |
| 2006/0179266 A1 | 8/2006 | Flood et al. |
| 2006/0184711 A1 | 8/2006 | Pettey et al. |
| 2006/0184767 A1 | 8/2006 | Le et al. |
| 2006/0184768 A1 | 8/2006 | Bishop et al. |
| 2006/0184769 A1 | 8/2006 | Floyd et al. |
| 2006/0184770 A1 | 8/2006 | Bishop et al. |
| 2006/0184946 A1 | 8/2006 | Bishop et al. |
| 2006/0195617 A1 | 8/2006 | Arndt et al. |
| 2006/0195619 A1 | 8/2006 | Arndt et al. |
| 2006/0195634 A1 | 8/2006 | Arndt et al. |
| 2006/0195642 A1 | 8/2006 | Arndt et al. |
| 2006/0195644 A1 | 8/2006 | Arndt et al. |
| 2006/0195663 A1 | 8/2006 | Arndt et al. |
| 2006/0195673 A1 | 8/2006 | Arndt et al. |
| 2006/0195848 A1 | 8/2006 | Arndt et al. |
| 2006/0206655 A1 | 9/2006 | Chappell et al. |
| 2006/0206936 A1 | 9/2006 | Liang et al. |
| 2006/0209863 A1 | 9/2006 | Arndt et al. |
| 2006/0212608 A1 | 9/2006 | Arndt et al. |
| 2006/0212620 A1 | 9/2006 | Arndt et al. |
| 2006/0212870 A1 | 9/2006 | Arndt et al. |
| 2006/0224790 A1 | 10/2006 | Arndt et al. |
| 2006/0230181 A1 | 10/2006 | Riley |
| 2006/0230217 A1 | 10/2006 | Moll |
| 2006/0242333 A1 | 10/2006 | Johnsen et al. |
| 2006/0242352 A1 | 10/2006 | Torudbakken et al. |
| 2006/0242354 A1 | 10/2006 | Johnsen et al. |
| 2006/0253619 A1 | 11/2006 | Torudbakken et al. |
| 2006/0271820 A1 | 11/2006 | Mack et al. |
| 2007/0019637 A1 | 1/2007 | Boyd et al. |
| 2007/0027952 A1 | 2/2007 | Boyd et al. |
| 2007/0097871 A1 | 5/2007 | Boyd et al. |
| 2007/0097948 A1 | 5/2007 | Boyd et al. |
| 2007/0097949 A1 | 5/2007 | Boyd et al. |
| 2007/0097950 A1 | 5/2007 | Boyd et al. |
| 2007/0101016 A1 | 5/2007 | Boyd et al. |
| 2007/0136458 A1 | 6/2007 | Boyd et al. |

OTHER PUBLICATIONS

U.S. Appl. No. 11/334,678, filed Jan. 18, 2006, Boyd et al.
U.S. Appl. No. 11/348,903, filed Feb. 7, 2006, Boyd et al.
U.S. Appl. No. 11/567,425, filed Dec. 6, 2006, Boyd et al.
U.S. Appl. No. 11/351,020, filed Feb. 9, 2006, Boyd et al.
U.S. Appl. No. 11/567,411, filed Dec. 6, 2006, Boyd et al.

* cited by examiner

BROADCAST OF SHARED I/O FABRIC ERROR MESSAGES IN A MULTI-HOST ENVIRONMENT TO ALL AFFECTED ROOT NODES

BACKGROUND OF THE INVENTION

1. Field of the Invention

The present invention relates generally to communication between a host computer and an input/output (I/O) adapter through an I/O fabric. More specifically, the present invention addresses the case where the I/O fabric is attached to more than one root node and where each root can potentially share with the other roots the I/O adapter (IOA) resources which are attached to the I/O.

2. Description of the Related Art

Multi-root configurations which share I/O fabrics have not been addressed adequately in the past, and errors detected in an I/O fabric will generally bring down all the systems that may be using that fabric, due to the unknown of which I/O devices are affected and which root nodes are using that I/O.

Thus, it would be advantageous to provide a mechanism for defining to the I/O fabric which I/O devices are affected by which errors, and also to which root nodes those I/O devices are assigned.

SUMMARY OF THE INVENTION

The present invention provides a method, apparatus, and computer usable medium for distributing input/output fabric errors to the appropriate root nodes in a multi-root environment. The present invention addresses the case where the input/output fabric is attached to more than one root node and where each root can potentially share with the other roots the input/output adapter resources which are attached to the input/output fabric. Additionally, the present invention provides a mechanism and method by which errors detected in an input/output fabric can be routed to all root nodes which may be affected by the error, while not being reported to the root nodes that will not be affected by those errors. In particular, the present invention specifically addresses the distributed computing system which uses the PCI Express protocol to communicate over the input/output fabric.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The aspects of the present invention provide for distributing input/output fabric errors to the appropriate root nodes in a multi-root environment. Addressed is the case where the input/output fabric is attached to more than one root node and where each root can potentially share with the other roots the input/output adapter resources which are attached to the input/output. Additionally, a mechanism is provided by which errors detected in an input/output fabric can be routed to all root nodes which may be affected by the error, while not being reported to the root nodes that will not be affected by those errors. In particular, a distributed computing system is addressed which uses the PCI Express protocol to communicate over the input/output fabric.

Figure 1:
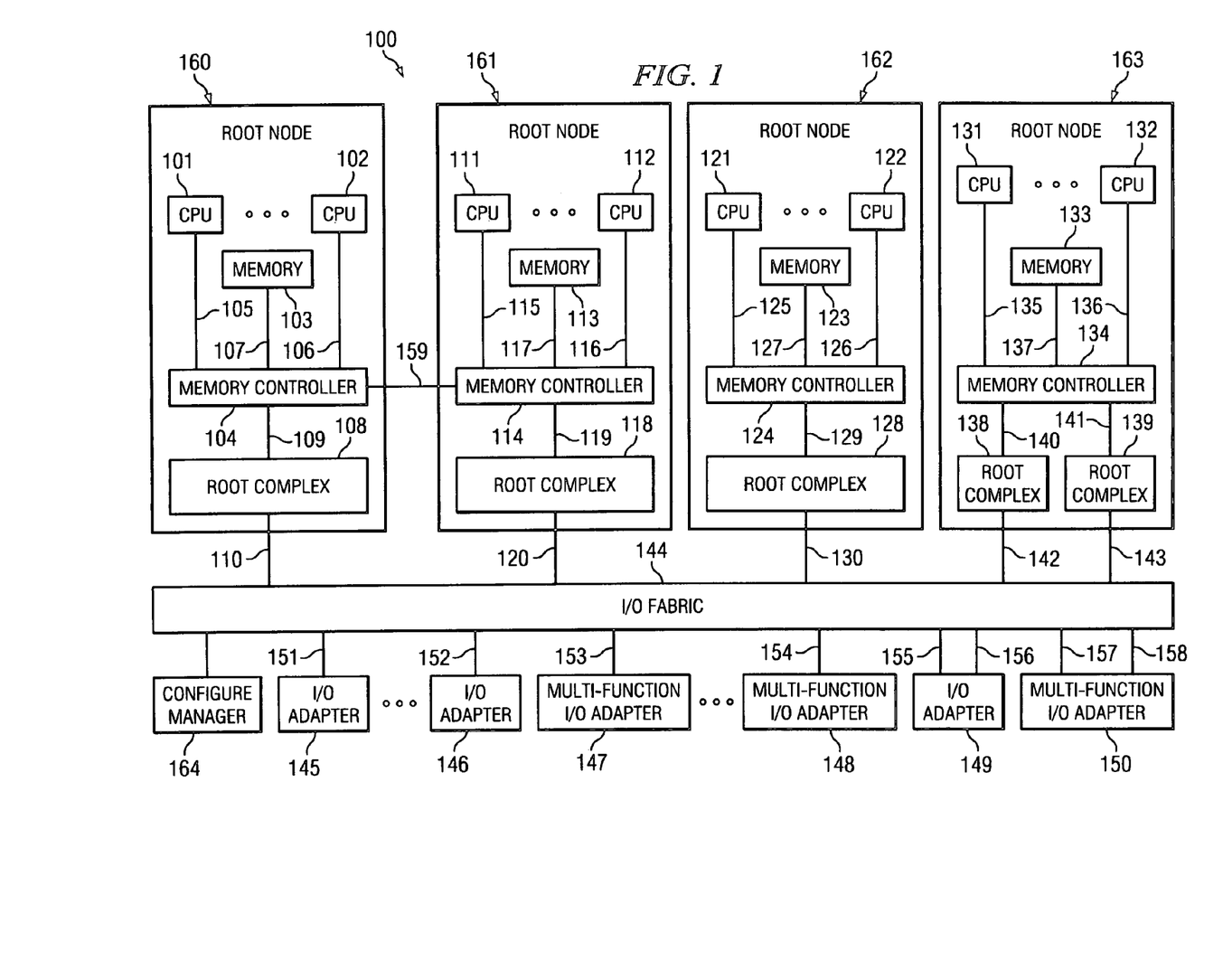
FIG. 1 is a diagram of a distributed computing system is illustrated in accordance with an illustrative embodiment of the present invention.

With reference now to the figures and in particular with reference to FIG. 1, a diagram of a distributed computing system is illustrated in accordance with an illustrative embodiment of the present invention. Distributed computer system 100 represented in FIG. 1 takes the form of one or more root complexes 108, 118, 128, 138, and 139, attached to I/O fabric 144 through I/O links 110, 120, 130, 142, and 143, and to memory controllers 104, 114, 124, and 134 of root nodes (RNs) 160, 161, 162, and 163. I/O fabric 144 is attached to I/O adapters 145, 146, 147, 148, 149, and 150 through links 151, 152, 153, 154, 155, 156, 157, and 158. I/O adapters 145, 146, 147, 148, 149, and 150 may be single function I/O adapters such as in 145, 146, and 149, or multiple function I/O adapters such as in 147, 148, and 150. Further, I/O adapters 145, 146, 147, 148, 149, and 150 may be connected to I/O fabric 144 via single links as in 145, 146, 147, and 148 or with multiple links for redundancy as in 149 and 150.

Root complexes 108, 118, 128, 138, and 139 are part of root nodes 160, 161, 162, and 163. More than one root complex per root node may be present as in root node 163. In addition to the root complexes, each root node consists of one or more central processing units (CPUs) 101, 102, 111, 112, 121, 122, 131, and 132, memory 103, 113, 123, and 133, memory controller 104, 114, 124, and 134 which connects CPUs 101, 102, 111, 112, 121, 122, 131, and 132, memory 103, 113, 123, and 133, and I/O root complexes 108, 118, 128, 138, and 139 and performs such functions as handling the coherency traffic for the memory.

Root nodes 160 and 161 may be connected together at connection 159 through their memory controllers 104 and 114 to form one coherency domain and which may act as a single symmetric multi-processing (SMP) system, or may be independent nodes with separate coherency domains as in root nodes 162 and 163.

Configuration manager 164 may be attached separately to I/O fabric 144 or may be part of one or more of the root nodes 160, 161, 162, and 163. Configuration manager 164 configures the shared resources of I/O fabric 144 and assigns resources to root nodes 160, 161, 162, and 163.

Distributed computing system 100 may be implemented using various commercially available computer systems. For example, distributed computing system 100 may be implemented using an IBM eServer™ iSeries® Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
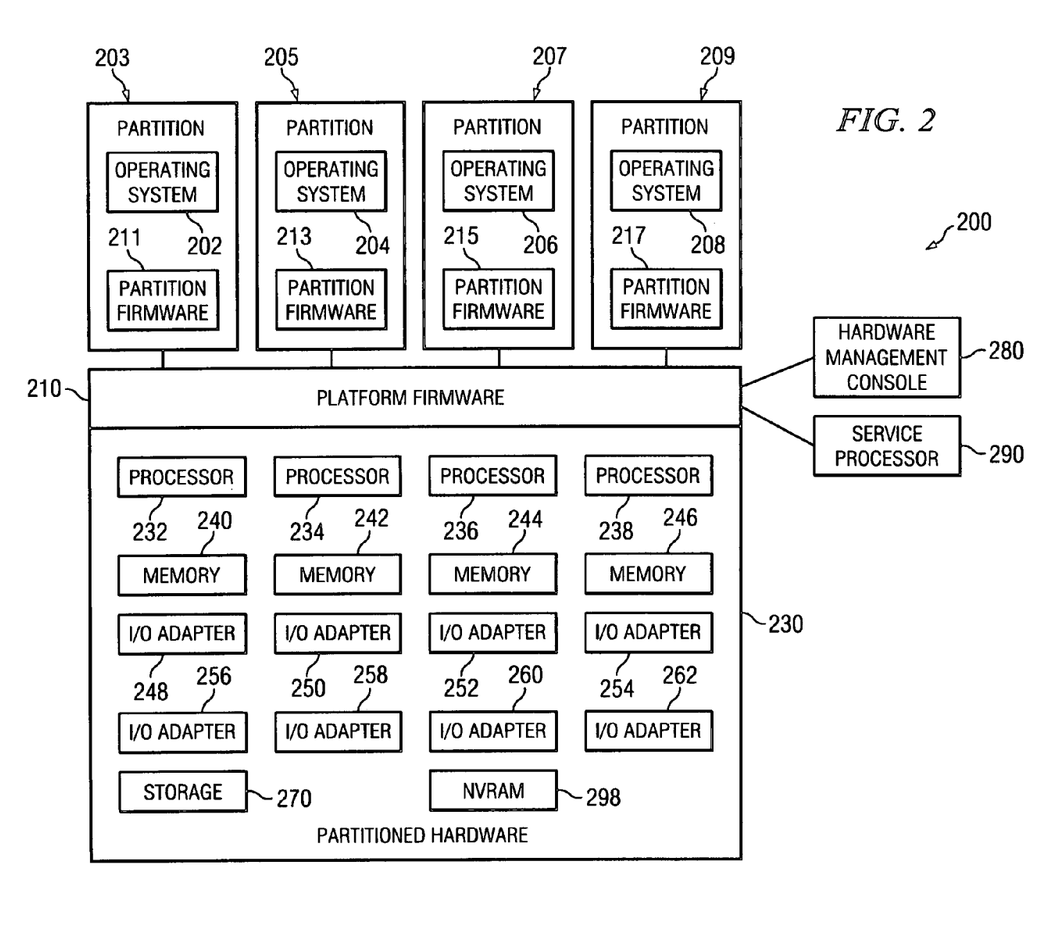
FIG. 2 is a block diagram of an exemplary logical partitioned platform is depicted in which aspects of the present invention may be implemented.

With reference now to FIG. 2, a block diagram of an exemplary logical partitioned platform is depicted in which the present invention may be implemented. The hardware in logical partitioned platform 200 may be implemented as, for example, distributed computing system 100 in FIG. 1. Logical partitioned platform 200 includes partitioned hardware 230, operating systems 202, 204, 206, and 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Other types of operating systems, such as AIX® and Linux, may also be used depending on the particular implementation.

Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (NVRAM).

Additionally, partitions 203, 205, 207, and 209 also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and runtime abstraction software. The processors associated or assigned to partitions 203, 205, 207, and 209 are then dispatched to the partition's memory to execute partition firmware 211, 213, 215, and 217.

Partitioned hardware 230 includes a plurality of processors 232, 234, 236, and 238, a plurality of system memory units 240, 242, 244, and 246, a plurality of I/O adapters 248, 250, 252, 254, 256, 258, 260, and 262, storage unit 270, and non-volatile random access memory storage 298. Each of the processors 232; 234, 236, and 238, memory units 240, 242, 244, and 246, non-volatile random access memory storage 298, and I/O adapters 248, 250, 252, 254, 256, 258, 260, and 262, or parts thereof, may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent operating system images 202, 204, 206, and 208 by virtualizing the hardware resources of logical partitioned platform 200.

Service processor 290 may be used to provide various services, such as processing of platform errors in partitions 203, 205, 207, and 209. These services also may act as a service agent to report errors back to a vendor, such as International Business Machines Corporation. Operations of partitions 203, 205, 207, and 209 may be controlled through a hardware management console, such as hardware management console 280. Hardware management console 280 is a separate distributed computing system from which a system administrator may perform various functions including reallocation of resources to different partitions. Operations which may be controlled include things like the configuration of the partition relative to the components which are assigned to the partition, whether the partition is running or not.

In a logical partitioning (LPAR) environment, it is not permissible for resources or programs in one partition to affect operations in another partition. Furthermore, to be useful, the assignment of resources needs to be fine-grained. For example, it is often not acceptable to assign all I/O adapters under a particular PCI Host Bridge (PHB) to the same partition, as that will restrict configurability of the system, including the ability to dynamically move resources between partitions.

Accordingly, some functionality is needed in the bridges that connect I/O adapters to the I/O bus so as to be able to assign resources, such as individual I/O adapters or parts of I/O adapters to separate partitions; and, at the same time, prevent the assigned resources from affecting other partitions such as by obtaining access to resources of the other partitions.

Figure 3:
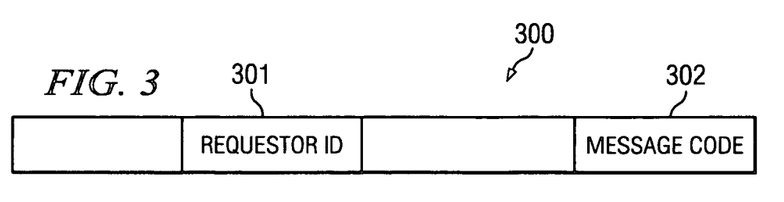
FIG. 3 is a general layout of a message request packet is depicted in accordance with an illustrative embodiment of the present invention.

Turning now to FIG. 3, a general layout of a message request packet is depicted in accordance with an illustrative embodiment of the present invention. In message request package 300 the key fields are the requestor ID 301 and the message code 302. Of particular interest in message request package 300 is message code 302 which may represent an error that has been identified by an entity represented by requestor ID 301. Requestor ID 301 provides an indication of the detector of the error, but not necessarily the entities that might be affected by the error. Accordingly, a way is needed to correlate missing information.

Figure 4:
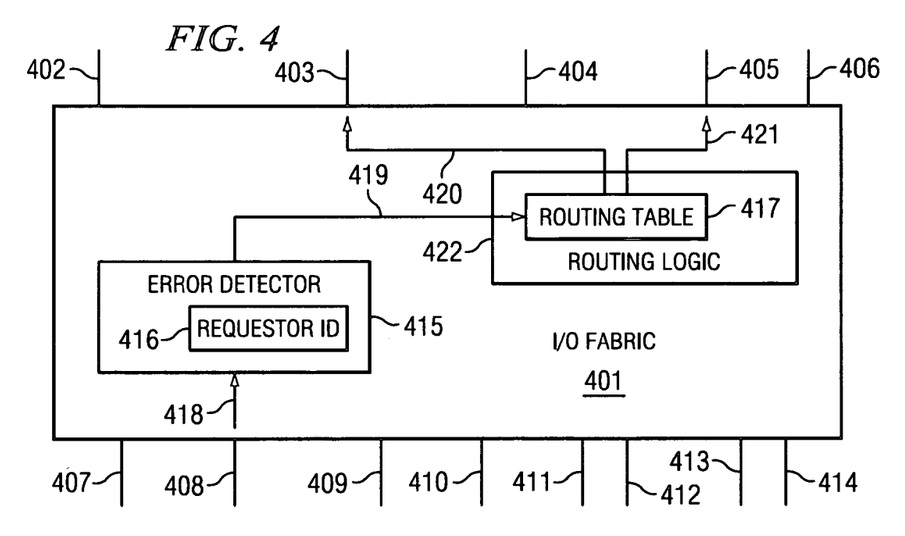
FIG. 4 depicts a method where error correlation and routing may be performed in accordance with an illustrative embodiment of the present invention.

FIG. 4 depicts a method where error correlation and routing may be performed in accordance with an illustrative embodiment of the present invention. I/O fabric 401 consists of root ports 402, 403, 404, 405, and 406 and secondary ports 407, 408, 409, 410, 411, 412, 413, and 414. Incoming transaction 418 contains an error that is detected by error detection logic 415 and the control logic for the error detection then generates a message request packet, such as message request package 300 of FIG. 3, into which it puts requestor ID 416. Requestor ID 416 is setup by the configuration code at fabric initialization time. As an exemplary aspect of the present invention, requestor ID 416 may be the bus number, device number, and function number of the device in the case of PCI Express. The message request packet is then passed through I/O fabric 401 at connection 419 until it reaches routing logic 422, which is located in I/O fabric 401 at a place which has access to all root ports 402, 403, 404, 405, and 406. At this point requestor ID 416 in the message request packet is used to access error routing table 417 and the information in routing table 417 is used to generate one error packet 420 and 421 per root port 403 and 405 that is affected. Routing table 417 may be any type of data structure where information is stored.

Figure 5:
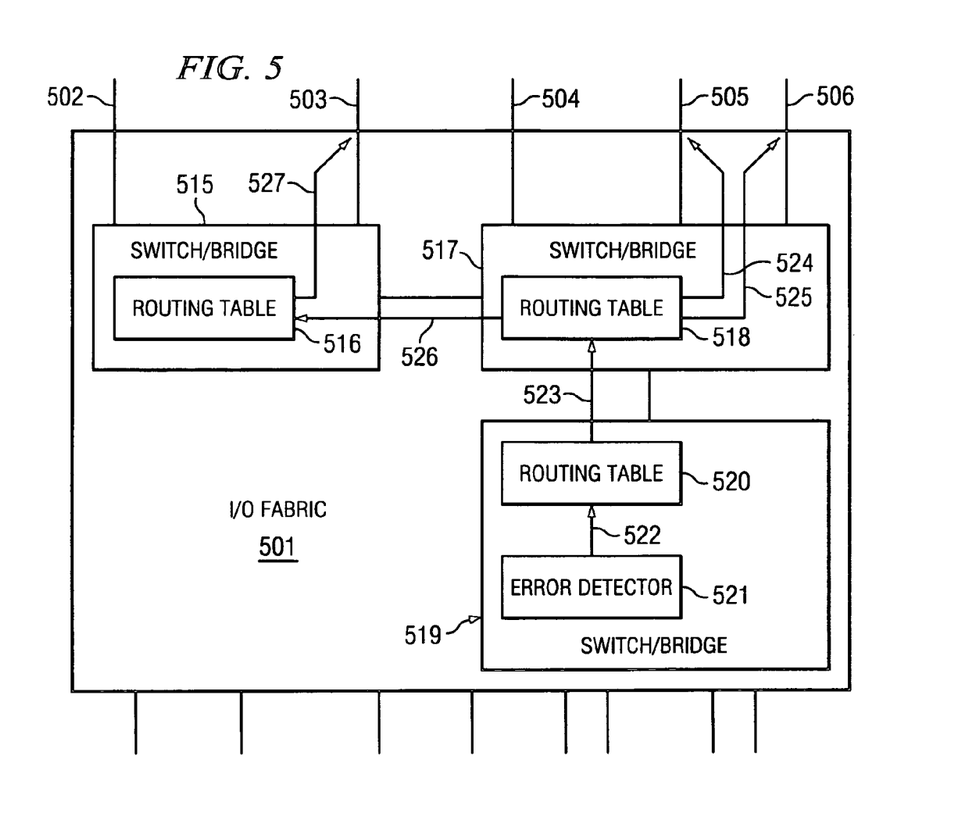
FIG. 5 depicts a configuration that necessitates a split of a routing table into multiple cascaded routing tables in accordance with an illustrative embodiment of the present invention.

FIG. 5 depicts a configuration that necessitates a split of a routing table into multiple cascaded routing tables in accordance with an illustrative embodiment of the present invention. In this case I/O fabric 501 has more than one switch or bridge 515 and 517 which interfaces to the root ports 502, 503, 504, 505, and 506. If there is more than one switch or bridge, then a routing table, such as routing table 417 of FIG. 4, needs to be split into routing tables 516 and 518. Connection between routing tables 516 and 518 is via intermediate link 526.

Additionally, there may be secondary bridge or switch 519 which may contain routing table 520. In this configuration, error detector 521 generates an error packet 522 with the error detector's ID in the requestor ID. Routing table 520 uses this requestor ID in error packet 522 to look up the routing which then routes error packet 522 as shown in connection 523. Likewise, routing table 518 determines that the correct routing of error packet 522 is to root ports 505 and 506 via connections 524 and 525, and to switch or bridge 515. When error packet 522 is received at switch or bridge 515 via intermediate link 526, routing table 516 determines that error packet 522 should be routed to root port 503 via connection 527.

Figure 6:
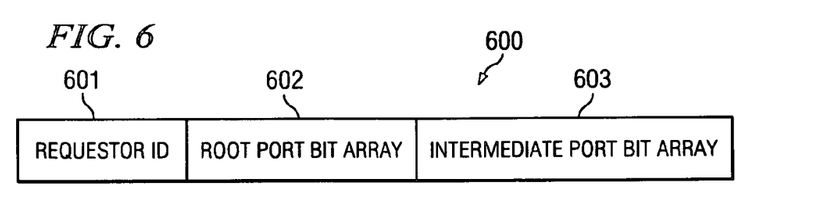
FIG. 6 shows an exemplary layout of a routing table entry which might be found in routing table in accordance with an illustrative embodiment of the present invention.

FIG. 6 shows an exemplary layout of a routing table entry which might be found in routing table, such as routing table 417 of FIG. 4, in accordance with an illustrative embodiment of the present invention. Routing table entry 600 consists of requestor ID 601, which may be one possible requester ID on the message request packet and corresponds to requestor ID 416 of FIG. 4 and is detected in error detector 415 of FIG. 4 or error detector 521 of FIG. 5. Also in routing table entry 600 is root port bit array 602 of which each bit corresponds to a possible root port to which the error might need to be routed, and also intermediate port bit array 603 of which each bit corresponds to a possible intermediate port to which the error might need to be routed.

Figure 7:
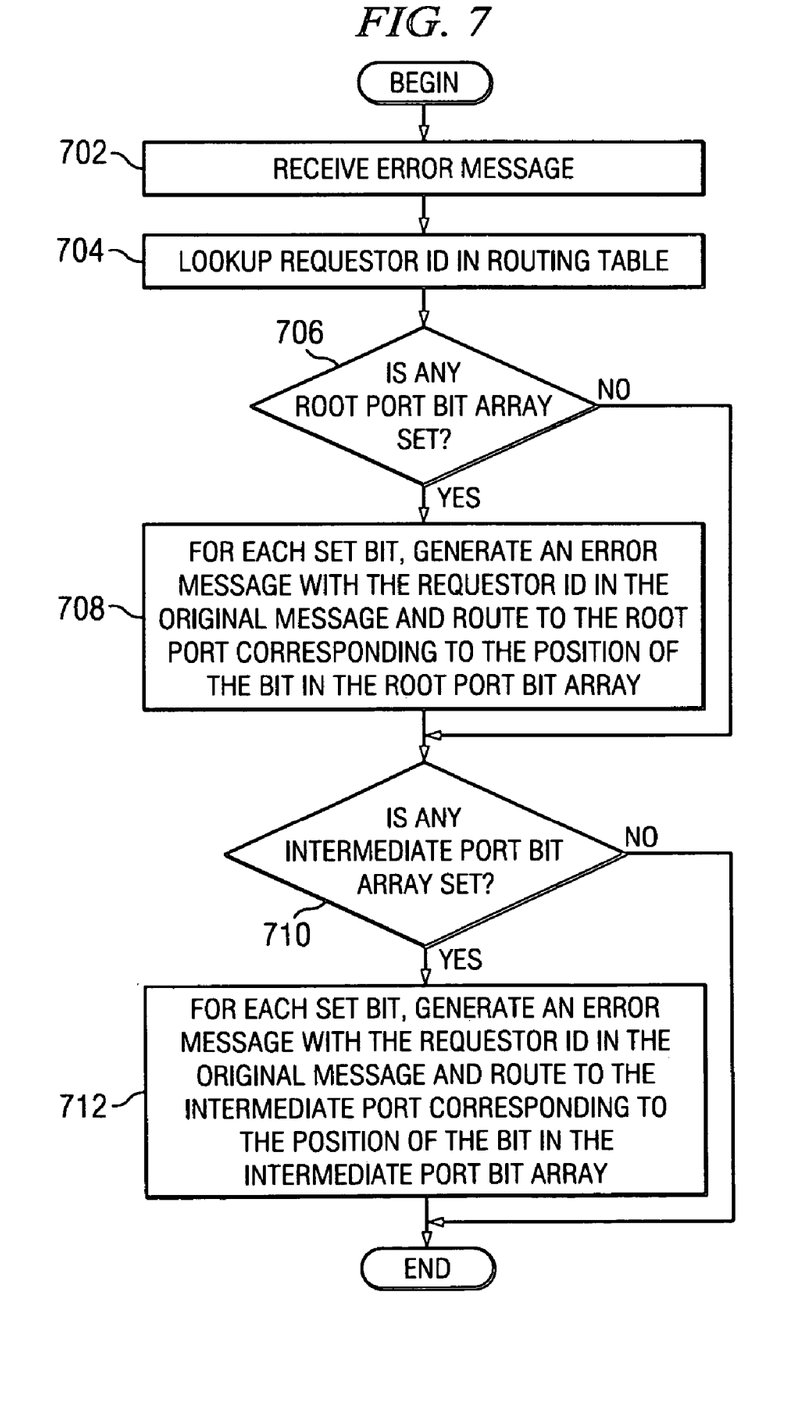
FIG. 7 is a flowchart depicting the operation through one level of the routing mechanism in accordance with an illustrative embodiment of the present invention.

FIG. 7 is a flowchart depicting the operation through one level of the routing mechanism in accordance with an illustrative embodiment of the present invention. As the operation begins, an error message is received by the routing mechanism (step 702). The requestor ID in the error message is then searched for in the routing table (step 704). Those knowledgeable in the art will recognize that the search of the correct entry in the routing table may be performed in any number of ways. Additionally, the routing table may be any type data structure where information is stored. For example, a content addressable memory, a scan of the table for a value of the requestor ID field in the table equal to the requestor ID in the error message, the use of the requestor ID in the error message as an index into the routing table, and so on. Upon finding the correct requestor ID entry, the associated root port bit array is checked for any bit that is set (step 706). If any bit is set in the root port bit array, then for each bit set, an error message is generated with the requestor ID in the original message, a determination is made of which port or ports is associated with the error message by searching the routing table, and each error message is routed to the root port or ports corresponding to the position of the bit in the root port bit array (step 708).

Next, the intermediate port bit array is checked for any bit that is set (step 710). Step 706 also proceeds to step 710 if there are no bits set in the root port bit array. If any bit is set in the intermediate root port bit array, then for each bit set, an error message is generated with the requestor ID in the original message, a determination is made of which port or ports is associated with the error message by searching the routing table, and each error message is routed to the intermediate port or ports corresponding to the position of the bit in the intermediate port bit array (step 712) with the operation ending thereafter. Step 710 also proceeds to the operation termination if there are no bits set in the intermediate port bit array.

Figure 8:
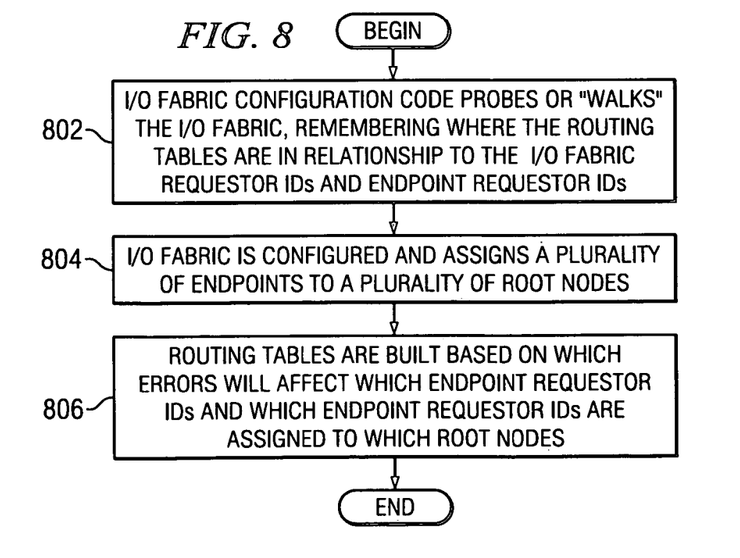
FIG. 8 depicts a high-level flowchart for the routing table build process in accordance with an illustrative embodiment of the present invention.

FIG. 8 depicts a high-level flowchart for the routing table build process in accordance with an illustrative embodiment of the present invention. As the operation begins the I/O fabric configuration code probes or "walks" the I/O fabric, remembering where the routing tables are in relationship to the I/O fabric requestor IDs and endpoint requestor IDs (step 802). As an example, the requestor ID for PCI Express may be bus number, device number, and function number. That is, a requester ID "tree" is remembered by the configuration software. This tree determines which errors will potentially affect which other IDs. That is, in processing an error for a given ID the software needs to assume that this error could affect all other IDs in the tree below that ID, and thus, if an error occurs for an ID that affects a plurality of IDs, and those plurality of IDs are assigned to a plurality of root nodes, then the mechanism described in this invention needs to replicate those error messages and deliver them to all affected root nodes.

As the I/O fabric configuration code probes or "walks" the I/O fabric is completed, the I/O fabric is configured and a plurality of endpoints are assigned to a plurality of root nodes (step 804). Assignment means that the root node is in control of the endpoint, including any error recovery. The method used to determine assignment is beyond the scope of this invention.

Next, the routing tables are built based on which errors will affect which endpoint requester IDs and which endpoint requester IDs are assigned to which root nodes (step 806). The routing tables are based on the information retained in steps 802 and 804. The routing table will contain an entry for each of the I/O fabric requestor IDs below it in the tree and each of these entries will also specify which root nodes are affected by an error on that particular requestor ID. How the tables are accessed to place the information from this step into them is beyond the scope of this invention, but those skilled in the art will realize that the configuration mechanism used to setup the fabric could be extended to allow for such access.

Those skilled in the art will recognize that this mechanism and method replaces the PCI Express mechanism and method defined as routing the error message upward to a single root port. The mechanism and method disclosed in this invention, then, allows additional control of direction and in copying the message to route to multiple root ports that might be affected by the error.

The invention may take the form of an entirely hardware embodiment or an embodiment containing both hardware and software elements. In a preferred embodiment, the invention is implemented in hardware and software, which includes but is not limited to firmware, resident software, microcode, etc.

Furthermore, aspects of the invention can take the form of a computer program product accessible from a computer-usable or computer-readable medium providing program code for use by or in connection with a computer or any instruction execution system. For the purposes of this description, a computer-readable medium can be any apparatus that can Contain or store that program for use by or in connection with the instruction execution System, apparatus, or device. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for distributing input/out fabric errors to root nodes in a multi-root environment, the computer implemented method comprising:
   receiving an error message in an input/output fabric, wherein the error message contains a requestor identifier;
   searching a routing table in a data structure to locate an entry that matches the requestor identifier;
   generating a root port error message for each bit that is set in a first bit array and a second bit array that are associated with the entry to form a set of generated messages, wherein the each bit in the first bit array represents a root port and wherein each bit in the second bit array represents an intermediate port;
   determining, by using the routing table, root port associated with each bit that is set in the first bit array, to form a set of determined root ports;
   determining, by using the routing table, the intermediate port associated with each bit that is set in the second bit array, to form a set of determined intermediate ports;
   assigning a root port error message in the set of generated messages to each port in the set of determined root ports and the set of determined intermediate ports to form a set of assigned messages; and
   sending the set of assigned messages.

2. A data processing system comprising:
   a bus system;
   a communications system connected to the bus system;
   a memory connected to the bus system, wherein the memory includes a set of instructions; and
   a processing unit connected to the bus system, wherein the processing unit executes the set of instructions to receive an error message in an input/out fabric, wherein the error message contains a requestor identifier; search a routing table in a data structure to locate an entry that matches the requestor identifier; generate a root port error message for each bit that is set in a first bit array and a second bit array that are associated with the entry to form a set of generated messages, wherein the each bit in the first bit array represents a root port and wherein each bit in the second bit array represents an intermediate port; determine, by using the routing table, the root port associated with each bit that is set in the first bit array, to form a set of determined root ports; determine, by using the routing table, the intermediate port associated with each bit that is set in the second bit array, to form a set of determined intermediate ports; assign a root port error message in the set of generated messages to each port in the set of determined root ports and the set of determined intermediate ports to form a set of assigned message; and send the set of assigned messages.

3. A computer readable medium encoded thereon computer program instructions for distributing input/output fabric errors to root nodes in a multi-root environment, the computer readable medium when executed by a computer which cause the computer to perform steps of:
   receiving an error message in an input/output fabric, wherein the error message contains a requestor identifier;
   searching a routing table in a data structure to locate an entry that matches the requestor identifier;
   generating a root port error message for each bit that is set in a first bit array and a second bit array that are associated with the entry to form a set of generated messages, wherein the each bit in the first bit array represents a root port and wherein each bi in the second bit array represents an intermediate port;
   determining, by using the routing table, the root port associated with each bit that is set in the first bit array, to form a set of determined root ports;
   determining, by using the routing table, the intermediate port associated with each bit that is set in the second bit array, to form a set of determined intermediate port;
   assigning a root port error message in the set of generated messages to each port in the set of determined root ports and the set of determined intermediate ports to form a set of assigned message; and
   sending the set of assigned message.

* * * * *